Patented May 15, 1934

1,958,418

UNITED STATES PATENT OFFICE 1,958,418

COATING COMPOSITION

William S. Calcott, Penns Grove, and Frederick B. Downing, Carneys Point, N. J., assignors to E. I. du Pont de Nemours & Company, Wilmington, Del., a corporation of Delaware No Drawing. Application January 9, 1930, Serial No. 419,734

6 Claims. (Cl. 134—40)

This invention relates to anti-fouling coating compositions, for example, paints and varnishes. More particularly it relates to the preparation and use of such preparations as are resistant or toxic to marine growths, especially those growths which accumulate on ship bottoms. Specifically it is concerned with a preparation of this nature containing a film forming agent and a toxic which is soluble in said agent.

Attempts to inhibit growths on ship bottoms and other submarine surfaces have been made by using coating materials in which there have been incorporated strong bases or toxic salts, particularly salts or derivatives of mercury and copper. The effectiveness of such coating compositions depends on the water solubility of these toxics. In order to utilize this water solubility it is necessary to employ a vehicle of such character that the water in which the coated body is immersed has ready access to the toxic substance. On this account the vehicles heretofore made use of have been of low mechanical strength and could be easily abraded, had low resistance to water penetration, had low resistance to hydrolysis or solution, or had a combination of these drawbacks. As a result, low durability or low toxicity or both were characteristic of the coating compositions heretofore employed.

This invention has as an object the preparation and use of a coating composition having high mechanical strength and resistance to abrasion. Other objects are to produce a material of this class having high resistance to water penetration, high resistance to hydrolysis and solution, high durability, high resistance to marine growth and high toxicity. Further objects are to produce a coating composition containing a toxic substance which is soluble in the film-forming agent, to produce such a composition having a tendency to "bloom out" the toxic substance as a surface layer, to use as a film forming agent a synthetic drying oil, to use aromatic compounds as toxics in such a material, to produce a new impregnating substance for material such as wood, to generally overcome the drawbacks of the prior art and to produce a superior anti-fouling coating agent. Still further objects will appear hereinafter.

These objects are accomplished by the following invention whereby an anti-fouling coating composition is made having a toxic which is soluble in the film forming agent. The other usual ingredients of paints, varnishes and the like may be present also.

It has been found that coating compositions particularly suitable for such purposes may be made by selecting as the toxic substance materials which are soluble in the vehicle, instead of being suspended therein as was done in the prior art. By the selection of organic toxic substances such as dinitrochlorobenzene
$C_6H_3(NO_2)_2Cl$, trinitrotoluene
$C_6H_2.CH_3(NO_2)_3$, trinitrophenol
$C_6H_2.OH(NO_2)_3$, dichlorobenzene
$C_6H_4Cl_2$, i-propyl naphthalene
$C_{10}H_7CH(CH_3)_2$, and the like which are soluble in the vehicle and to a lesser extent in the final film of resin or resinous material, coating compositions of high resistance to water and to the formation of marine growth may be prepared. It is particularly advantageous to employ these substances in quantities exceeding their solubility in the resin, so that the toxic substance tends to "bloom out" on the surface of the film or coating thereby increasing the effective concentration and the toxicity (the "blooming out" process being analogous to the well-known formation of a sulfur, stearic acid, or paraffine layer on the surface of rubber).

Synthetic drying oil prepared from nonbenzenoid polymers of acetylene is particularly suitable for the preparation of such anti-fouling paints, both because of the chemical inertness and high resistance of the film, and because of the low solubility of most organic substances in its resin film and their consequent high tendency to "bloom out" on the surface. As a specific example of the preperation of the synthetic drying oil the following is given:

One thousand (1000) grams of the nonbenzenoid polymers of acetylene are boiled at atmospheric pressure and in the presence of air for 4 hours in a vessel provided with a condenser for the return of the condensed vapors to the reaction. The temperature of the boiling liquid is between 85° and 90° C. At the end of the 4 hours the unchanged polymer substance is distilled off under reduced pressure. There remains, in 12 to 18% yield, a viscous non-volatile residue having the general properties of a bodied drying oil.

The "nonbenzenoid polymers of acetylene" substance referred to above is prepared by mixing 945 parts by weight of ammonium chloride, 1000 parts by weight of water, 2850 parts by weight of cuprous chloride, and 100 parts by weight of copper powder, and agitating this mixture thoroughly while passing into it acetylene gas. When the reaction slows up, as shown by a decrease in the rate of absorption of acetylene, the operation is discontinued, and the hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass.

The toxic may be added to the other constituents of the coating composition at any suitable time, for example, it may be mixed directly with the film forming agent, or may be dissolved in a solvent and this solution added to the film forming agent and then the final mixture milled with a suitable quantity of pigment and filler. The toxic may be added to previously prepared paints, varnishes, and coating compositions by direct mixing or by addition to a volatile solvent and addition of the resultant solution to the coating composition.

The new products are illustrated in the following example:

Example 1 part of dinitrochlorobenzene is dissolved in 50 parts by weight of exylene. This solution is added to 50 parts by weight of synthetic drying oil prepared from the nonbenzenoid polymers of acetylene and the resulting liquid compounded with 150 parts of silica by ball milling.

Preferably chlorobenzene compounds are used as toxics. Especially good results have been obtained with dinitrochlorobenzene. It is not, however, intended to limit this invention to these compounds or those cited in the specific examples given above. Aromatic nitro-chloro and amino bodies, sulfonic acids, and the like, the aromatic hydrocarbons themselves and water insoluble or slightly soluble hydrocarbon derivatives of the aromatic hydrocarbons may be used. In addition to the specific compounds named above as examples of these classes, other members which are suitable toxics are benzyl-bromide or chloride, phenylenediamine, diphenylamine, a-naphthalene-sulfonic acid, naphthalene, p-hydroxy diphenyl, and the like. Lead ethyl and other toxic metallo organic derivatives may also be employed, subject to the limitations, low solubility in water and solubility in the vehicle.

The coating material may be thinned, that is its viscosity may be decreased, by dilution with solvent naphtha, toluene, xylene, and the like. Should it be desired to increase the viscosity of the coating composition, this may be done by the addition of more pigment or drying oil or both.

Coating compositions prepared according to this invention are particularly advantageous when synthetic drying oil is used for the reason that this vehicle is of itself somewhat toxic.

This invention offers a solution of the problem of inhibition of marine growth entirely different from the prior art. The desirable coatings of the prior art could be easily removed by merely rubbing the hand across the coated surface. In contrast therewith, the compositions prepared in accordance with this invention form strong films which are extremely resistant to abrasion. This property, however, does not lower the toxicity of the coating for, as stated above, the toxic is soluble in the film and, therefore, any organism or like body seeking to attach itself, to the protected surface comes in contact with the toxic substance at the same time it touches the film of the coating material. In the case where the toxic has "bloomed out" even better protection is afforded since the growth contacts the free toxic before the coating proper.

The manner in which these coating compositions function has not been definitely determined and applicants do not wish to be limited to any particular theory, but it is probable that the following explanation of their action is correct. The coatings of the prior art yielded their toxic material to the surrounding water producing a solution which was taken into the digestive, respiratory or like system of the organism where its toxic effect was exerted. Applicants' toxic materials may be taken into the system of the organism by the same passages producing similar effects, but in addition operate in two other ways. The toxics listed by applicants are corrosive to organic tissue and destroy it upon contact. The impossibility of attachment to a surface protected by a paint containing such materials is obvious. Furthermore these materials when in contact with organic tissue are absorbed thereby. This absorption renders it unnecessary for the toxic to enter the organism by a natural channel, for instance the respiratory system mentioned above. This property gives the toxic a wider range of operation and makes it more universal in application.

Furthermore in the coatings previously used, the toxic solution was formed by the water passing through the film and leaching out the toxic, the particles of which were substantially fixed in the film. In contrast therewith, according to the present invention the toxic (in the process of "blooming out") passes through the film to the outside where it contacts with the surrounding water. This latter action permits the use of a stronger film and one which is impervious to water. Both of these features are conducive to longevity of film life and its attendant advantages.

As many apparently widely different embodiments of this invention may be made without departing from the spirit and scope thereof, it is to be understood that we do not limit ourselves to the specific embodiments thereof except as defined in the appended claims.

The term "synthetic drying oil" wherever used throughout the specification and claims is intended to mean any compound or mixture of compounds which is synthetically prepared, which possesses no appreciable vapor pressure at normal temperatures, and which absorbs oxygen forming hard and resinous films in a manner analogous to the well-known natural drying oils such as the glycerides of linoleic and linolenic acids.

The term "film-forming agent" as used throughout the specification and claims signifies a material capable of forming homogeneous, amorphous, resinous films. Drying oils constitute a member of this class.

The term "volatile solvent" embraces any liquid in which the film-forming constituents, driers, etc. may be dissolved and in which the pigments and fillers are generally suspended by milling, and which is sufficiently volatile in that it will evaporate leaving a film of the relatively non-volatile constituents when exposed to air at normal temperatures in the form of films.

We claim:

1. A toxic coating composition containing a synthetic drying oil film forming agent prepared from the nonbenzenoid polymers of acetylene, and an aromatic hydrocarbon toxic substance, the toxic substance being soluble in the film forming agent but present in greater amount than the quantity of film forming agent present can dissolve.

2. A coating composition comprising a synthetic drying oil prepared from a non-benzenoid acetylene polymer and an aromatic hydrocarbon toxic soluble in said oil and of the class consisting of dinitrochlorobenzene, trinitrotoluene, trinitrophenol, dichlorobenzene and i-propyl naphthalene, said toxic being present in an amount in excess of that amount soluble in the dried oil.

3. A coating composition comprising a synthetic drying oil prepared from a non-benzenoid acetylene polymer and a toxic chlorobenzene compound, said toxic being present in an amount in excess of that amount soluble in the dried oil.

4. A coating composition comprising a synthetic drying oil prepared from a non-benzenoid acetylene polymer and a toxic nitrobenzene compound, said toxic being present in an amount in excess of that amount soluble in the dried oil.

5. A coating composition consisting of one part by weight of dinitrochlorobenzene, up to fifty parts by weight of a volatile solvent, fifty parts by weight of synthetic drying oil prepared from non-benzenoid polymers of acetylene and one hundred fifty parts by weight of pigment.

6. A coating composition comprising a toxic substance dissolved in a synetheic drying oil prepared from a non-benzenoid acetylene polymer, said toxic being less soluble in the dried than the undried oil and being present in such amount that it will be precipitated from solution upon the drying of the oil.

WILLIAM S. CALCOTT.
FREDERICK B. DOWNING.